under 35 U.S.C. 154(b) by 627 days.

(12) United States Patent
Abe (10) Patent No.: US 8,217,976 B2
(45) Date of Patent: Jul. 10, 2012

(54) IMAGE FORMING APPARATUS, MANUFACTURING METHOD THEREOF, AND EXPOSING DEVICE

(75) Inventor: Naoki Abe, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 627 days.

(21) Appl. No.: 12/408,780

(22) Filed: Mar. 23, 2009

(65) Prior Publication Data

US 2009/0295903 A1    Dec. 3, 2009

(30) Foreign Application Priority Data

May 29, 2008    (JP) .................. 2008-141145

(51) Int. Cl.
B41J 2/47        (2006.01)
B44J 2/435       (2006.01)

(52) U.S. Cl. ......... 347/234; 347/117; 347/228; 347/248

(58) Field of Classification Search ............... 347/116, 347/228, 234, 248

See application file for complete search history.

(56) References Cited

U.S. PATENT DOCUMENTS

| 6,201,596 | B1   | 3/2001 | Sugita |         |
|-----------|------|--------|--------|---------|
| 6,215,511 | B1 * | 4/2001 | Asako et al. | 347/234 |
| 6,366,304 | B1   | 4/2002 | Nakayasu et al. | |
| 7,375,738 | B2 * | 5/2008 | Corbett et al. | 347/234 |
| 7,688,341 | B2 * | 3/2010 | Hilton | 347/254 |

FOREIGN PATENT DOCUMENTS

| JP | 11-138898 A   | 5/1999  |
| JP | 2001-096803 A | 4/2001  |
| JP | 2001-232867   | 8/2001  |
| JP | 2007-316252 A | 12/2007 |

OTHER PUBLICATIONS

JP Office Action dtd Feb. 2, 2010, JP Appln. 2008-141145, Partial English translation.

* cited by examiner

*Primary Examiner* — Ryan Lepisto
*Assistant Examiner* — Erin Chiem
(74) *Attorney, Agent, or Firm* — Banner & Witcoff, Ltd.

(57) ABSTRACT

A method and apparatus usable in an image forming apparatus, comprising a photoreceptor, and a plurality of exposing devices having a plurality of light emitting elements arranged therein for exposing the photoreceptor, wherein the plurality of exposing devices include at least two exposing devices having a distribution tendency similar to the plurality of light emitting elements.

8 Claims, 12 Drawing Sheets

IMAGE FORMING APPARATUS, MANUFACTURING METHOD THEREOF, AND EXPOSING DEVICE

CROSS REFERENCE TO RELATED APPLICATION

This application claims priority from Japanese Patent Application No. 2008-141145 filed May 29, 2008. The entire content of this priority application is incorporated herein by reference.

TECHNICAL FIELD

The present disclosure relates to an image forming apparatus, a manufacturing method thereof, and an exposing device.

BACKGROUND

An electrophotographic image forming apparatuses can include, for example, an LED head having a plurality of LEDs (light emitting elements) arranged in a row, and forms an electrostatic latent image by exposing a photoreceptor line by line with this LED head. A color image forming apparatus includes a plurality of above-mentioned LED heads corresponding to each color, and forms an electrostatic latent image with each LED head, so that a color image is ultimately formed on a body to be transferred, with each color image developed from respective electrostatic latent images overlapped one after another.

Here, it is ideal that an LED head includes LEDs all aligned in a straight line. However, such an ideal LED head is difficult to manufacture, and thus, in an actual LED head, one or more of the LEDs can be distributed out of a straight line. Moreover, this distribution tendency of LEDs is different for each LED head. Consequently, the above image forming apparatus may have a different shape of exposing line for each LED head corresponding to each color, and, as a result, a color image having a position deviation (color deviation) between each color image is formed on a body to be transferred, thereby causing deterioration of image quality.

In response, an image forming apparatus that conducts correction processing for restraining deterioration of image quality caused by the difference of distribution tendency of LEDs has been proposed. In particular, when an LED head of each color forms an exposing line, a light emission timing of an LED head corresponding to one color is corrected so that an position deviation relative to the other color image as a reference color image is offset.

SUMMARY

However, the above-mentioned conventional image forming apparatus conducts the above correction processing every time it performs image formation on a body to be transferred, and therefore still has a problem of having large processing load.

A method and apparatus usable in an image forming apparatus, comprising a photoreceptor, and a plurality of exposing devices having a plurality of light emitting elements arranged therein for exposing the photoreceptor, wherein the plurality of exposing devices include at least two exposing devices having a distribution tendency similar to the plurality of light emitting elements.

BRIEF DESCRIPTION OF THE DRAWINGS

Illustrative aspects in accordance with the invention will be described in detail with reference to the following figures wherein.

DETAILED DESCRIPTION

[One Aspect]

One aspect of the present invention is described as referring now to FIGS. 1 to 9.

[Entire Configuration of Printer]

Figure 1:
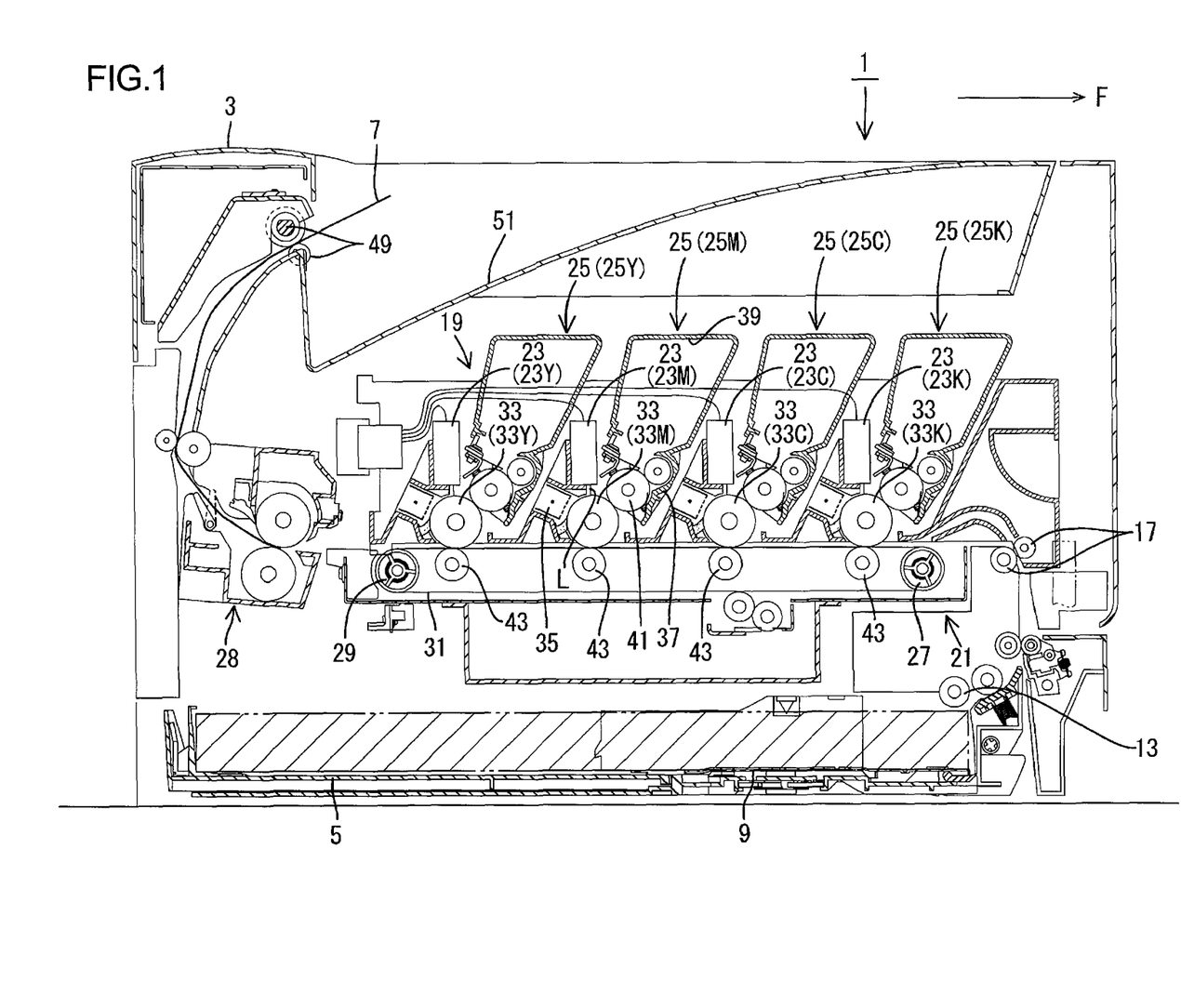
FIG. 1 is a sectional side view showing a general configuration of a printer in one aspect according to the present invention.

FIG. 1 is a sectional side view showing a general configuration of a printer 1 (one example of an image forming apparatus) according to the present aspect. Additionally, in the following explanation, the right hand of the page space in FIG. 1 is the front of the printer 1 and shown with "F direction" in the figure. Also, the printer 1 is a color printer that forms a color image using toner of various colors (black K, cyan C, magenta M, and yellow Y), and has a plurality of components corresponding to each color. Hereinafter, when distinguishing each components by colors, K (black), C (cyan), M (magenta), and Y (yellow) that indicate each color are allotted on every end of numerals of those component.

As shown in FIG. 1, the printer 1 is a color LED printer of direct-transfer tandem type, comprising a casing 3. On the bottom of the casing 3, there is provided a paper tray 5, in which a recording medium 7 (for example, a sheet material such as a paper, plastic, and the like) is stacked.

The recording medium 7 is moved toward a pick-up roller 13 by a pressing plate 9, and delivered to a registration roller 17 due to the rotation of the pick-up roller 13. The registration roller 17 conducts a skew correction of the recording medium 7, before delivering the recording medium 7 to a belt unit 21 at a prescribed timing.

The image forming unit 19 can include the belt unit 21 as an example of a delivery mechanism, an exposing unit 23, a process unit 25, and a fixing unit 28.

The belt unit 21 includes a belt 31 extending between a pair of support roller 27 and 29. The belt 31 circulates in a counterclockwise direction in FIG. 1 due to, for example, the rotational drive of a support roller 29 in the rear side, and delivers the recording medium 7 positioned on the belt 31 to the rear direction.

The printer 1 includes four exposing units 23 (23K, 23C, 23M, and 23Y. Each exposing unit 23 includes a plurality of light emitting diodes 30 (LED chips: one example of a light emitting element) arranged in a row along an axial direction of a photoreceptor 33, and controls ON/OFF of the plurality of light emitting diodes 30 based on image data of each color, so as to expose the photoreceptor 33 line by line and form an electrostatic latent image. In addition, the printer 1 with the exposing unit 23 removed is one example of "body of an image forming apparatus" according to the present invention.

Each process unit 25 is constituted identically, except the toner color, and can include photoreceptor 33, a charger 35, and a developing cartridge 37. The developing cartridge 27 is provided with a toner storing chamber 39 and a developing roller 41, and the toner in the toner storing chamber 39 is supplied onto the developing roller 41.

The surface of the photoreceptor 33 is uniformly and positively charged by the charger 35. After that, each line is exposed by a light L emitted from the exposing unit 23, thereby forming an electrostatic latent image corresponding to each color image.

Next, the toner held on the developing roller 41 is supplied to the electrostatic latent image formed on the surface of the photoreceptor 33. This allows the electrostatic latent image on the photoreceptor 33 to become a visible image as a toner image of each color.

After that, while a transfer bias is applied to a transfer roller 43, and the recording medium 7 being delivered by the belt 31 passes through each transfer position between the photoreceptor 33 and the transfer roller 43, the toner image held on the surface of each photoreceptor 33 is sequentially transferred to the recording medium 7. The recording medium 7 to which a toner image has been transferred in the above manner is then heat-fixed by the fixing unit 28, before being discharged onto a catch tray 51 by the paper-discharging roller 49.

[Electrical Configuration of Printer]

Figure 2:
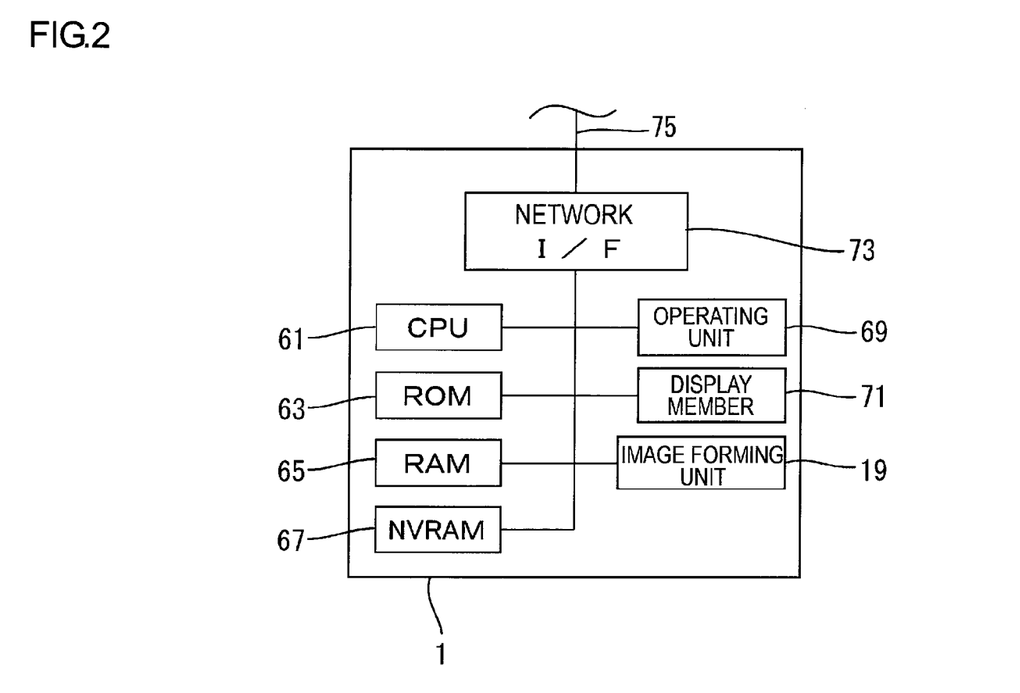
FIG. 2 is a block diagram showing an electrical configuration of a printer.

FIG. 2 is a block diagram showing an electrical configuration of the above-mentioned printer 1.

The printer 1 can include a CPU 61, a ROM 63, a RAM 65, a NVRAM 67, an operating unit 69, a display member 71, the previously-mentioned image forming unit 19, and a network interface 73.

The ROM 63 records various programs (including the later-described program for judging processing of arrangement error for an LED head) for controlling operations of the printer 1, and, in accordance with the program read out from the ROM 63, the CPU 61 can control the operation of the printer 1, while at the same time, recording the processing results into the RAM 65 and NVRAM 67.

The operating unit 69 includes a plurality of buttons and allows an user to conduct various inputting operations such as directing print-start. The display member 71 is constituted by a liquid crystal display and a lamp, and capable of displaying various setting screens and operational states. The network interface 73 can be connected to an external computer (not shown) via a communication line 75, so as to enable mutual data communication.

[Configuration of LED Head]

Figure 3:
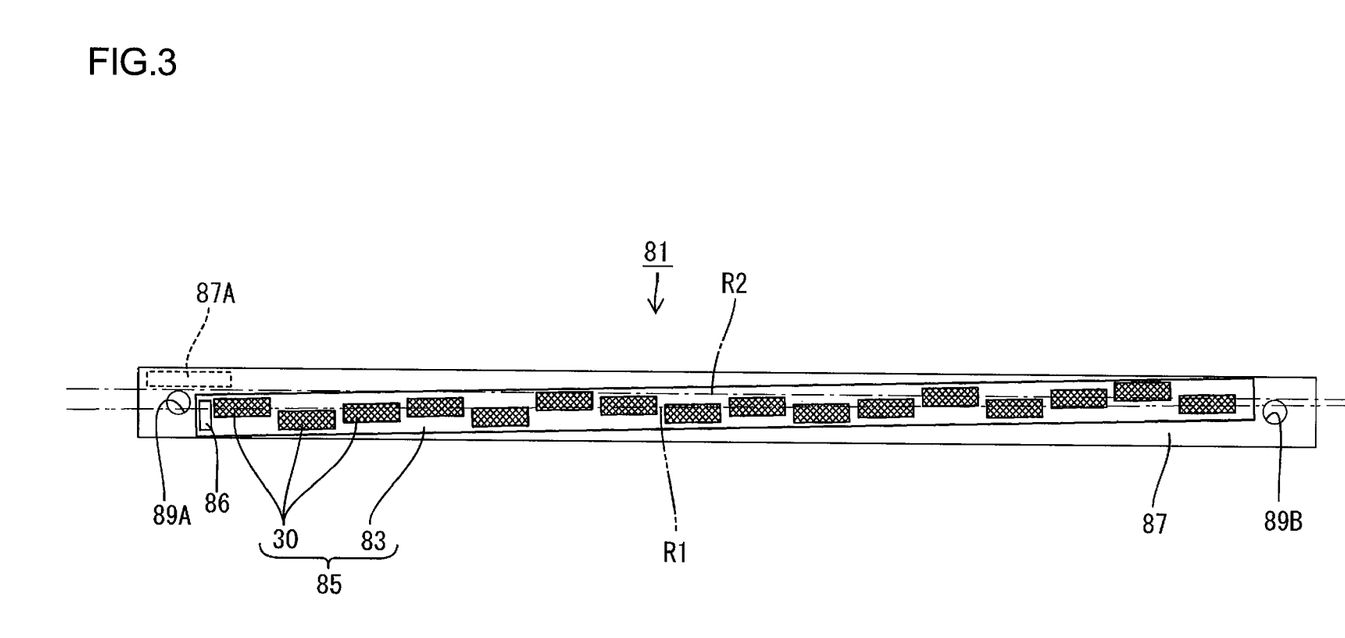
FIG. 3 is a pattern diagram showing a configuration of an LED head.

FIG. 3 is a pattern diagram showing a configuration of an LED head 81. As shown in the figure, the LED head 81 (one example of "exposing device") is respectively provided in each exposing unit 23. In particular, the LED head 81 mainly includes a light emitter 85 and a support member 87 to which the light emitter 85 is fixed. The light emitter 85 can have a structure such as the above-mentioned plurality of light emitting diodes 30 are aligned on a elongated substrate 83. In addition, a memory 86 (such as an EEPROM) is provided on the substrate 83. Also, in the both ends of the support member 87, reference holes 89A and 89B are formed so that a fixing pin (not shown) passes there through, thereby fixing the support member 87 to the inside of the casing 3. In the following description, the reference hole 89A is a reference hole positioned in the left side in FIG. 3, while the reference hole 89B is a reference hole positioned in the right side in the same figure.

[Degradation of Image Quality Based on Difference of Distribution Tendency of Light Emitting Diode]

It is ideal for the exposing unit 23 to have the light emitting diodes 30 aligned in a straight line (for example, a line R1 connecting the light emitting diode 30 in a position closest to the reference hole 89A and the light emitting diode 30 in a position closest to the reference hole 89B: one example of "a line connecting both ends of a plurality of light emitting elements"). However, as shown in FIG. 3, not all the light emitting diodes 30 are aligned on the above-mentioned line R1 in the actual exposing unit 23, and a part of the light emitting diodes 30 are distributed in positions out of the line R1. Hereinafter, such a tendency of positional unevenness of a group of the light emitting diodes 30 relative to a straight line is called "distribution tendency of light emitting diode".

The distribution tendency of the light emitting diode 30 may be different for each LED head 81 due to manufacturing errors. In addition, when the distribution tendency of the light emitting diode 30 is different for each other between the above four LED heads 81 assembled in the printer 1, the shape of exposing line differs for each LED head 81. Consequently, a color image, with positional deviation (color deviation) of each color image on the recording medium 7, is formed, and may cause image quality degradation. In the present aspect, for the purpose of restraining such degradation of image quality caused by the difference of distribution tendency of the light emitting diode 30, a manufacturing step of the printer 1 can include an extracting process described below.

[Manufacturing Process of Printer]

Figure 4:
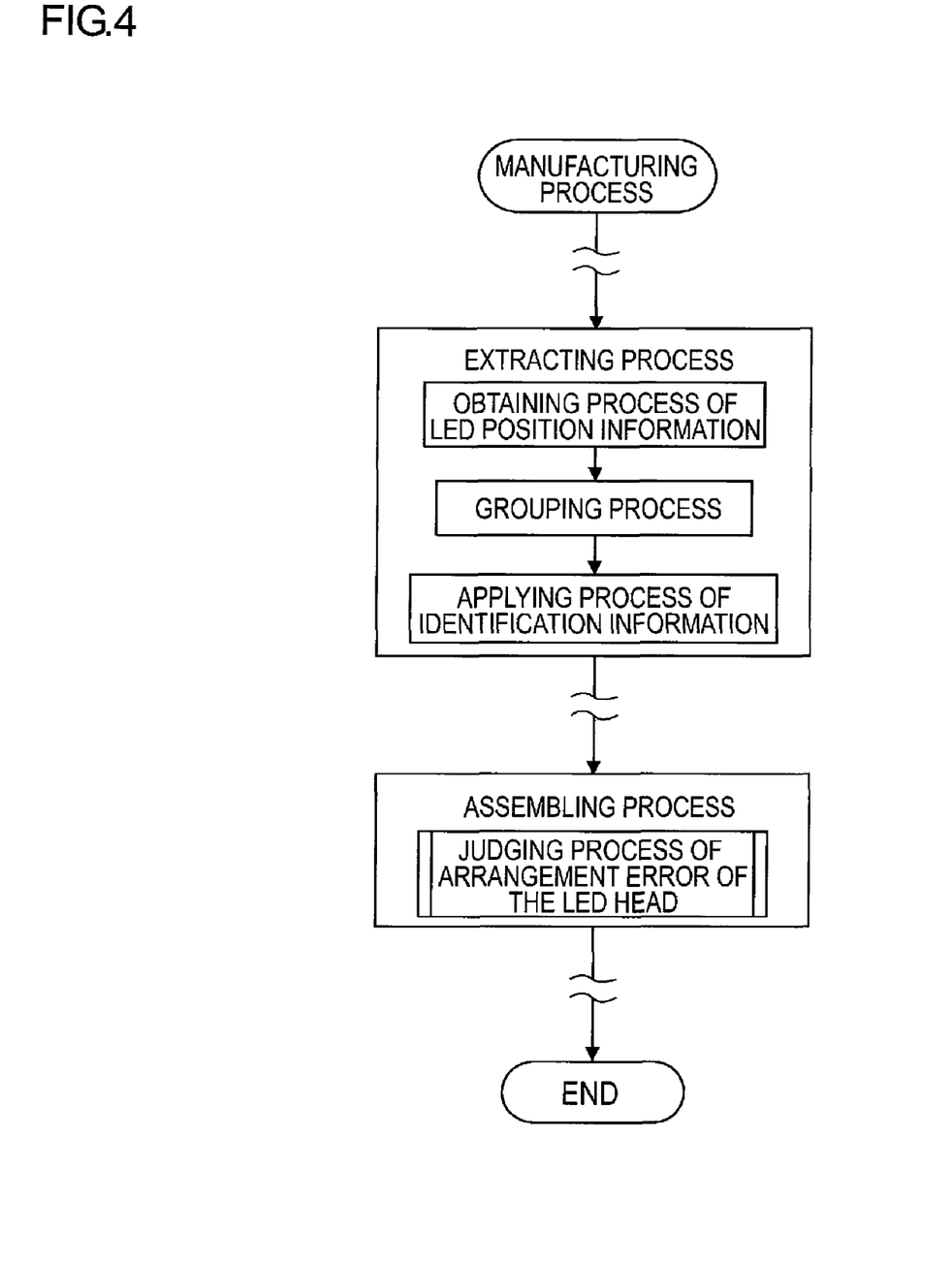
FIG. 4 shows a part (extracting process and assembling process) of a flow of a manufacturing process of a printer.

FIG. 4 shows a part (extracting process and assembling process) of the flow of a manufacturing process of the printer 1. In what follows, the extracting process and the assembling process in the manufacturing process of the printer 1 are explained, omitting explanation of other processes, for which well-known processes are employed.

In the present aspect, for the purpose of restraining degradation of image quality caused by the difference of distribution tendency of the light emitting diode 30, the extracting process of the LED head 81 comes earlier than the assembling process of the LED head 81 to the printer 1 in the manufacturing processes of the printer 1. Additionally, other processes may be conducted between the extracting process and the assembling process.

(1) Extracting Process

The extracting process is for extracting two or more LED heads 81 having similar distribution tendency of the light emitting diode 30 from a plurality of LED head 81 (self-manufactured or purchased from other company). In what follows, the LED head 81 before extraction is called "before-extraction head 81B", while the LED head 81 after extraction is called "after-extraction head 81A". Also, as shown in FIG. 4, the extracting process includes an obtaining process of LED position information, a grouping process, and an applying process of identification information.

Figure 5:
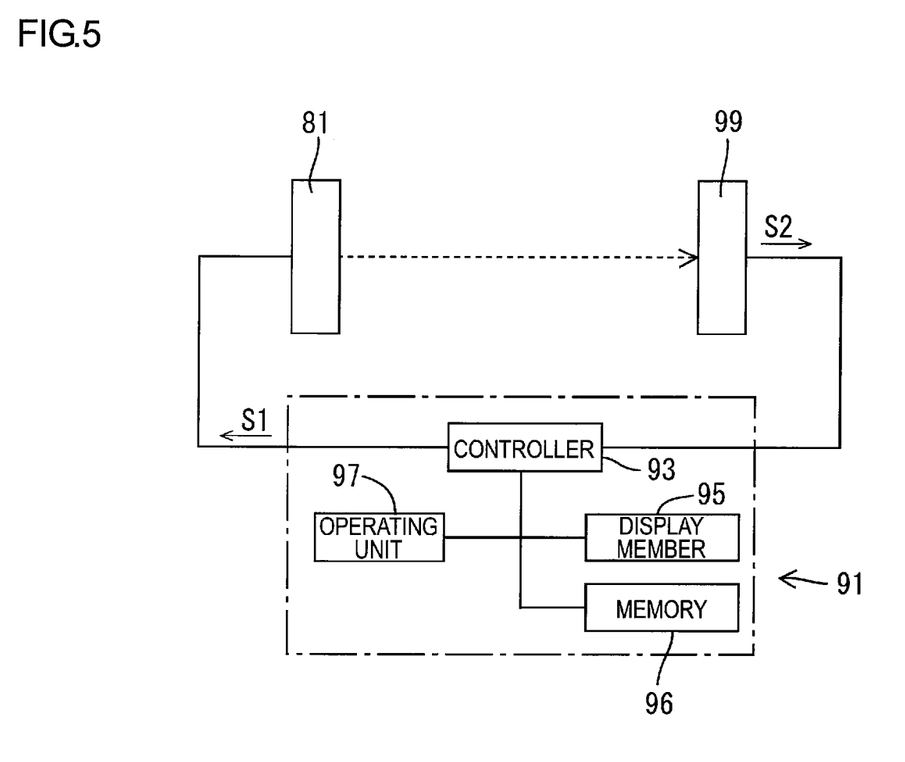
FIG. 5 is a block diagram showing a configuration of a processing apparatus.

FIG. 5 is a block diagram showing a configuration of a processing apparatus 91. This processing apparatus 91 is used in the above-mentioned obtaining process of LED position information and the grouping process, and includes a controller 93, a display member 95, a memory 96, an operating unit 97, and an image pickup device 99 (for example, CCD and CMOS). The extracting process firstly connects each before-extraction head 81 with the processing apparatus 91, and disposes the before-extraction head 81 so as to oppose to the image pickup device 99.

After that, when an operator conducts instruction operation of the extraction command using the operating unit 97, the controller 93 firstly proceeds to the obtaining process of LED position information. In particular, the controller 93 gives the before-extraction head 81B a driving signal S1, so that the light emitting diode 30 emits a light and forms an irradiation image on the image pickup device 99. In addition, the controller 93 obtains an image pickup signal S2 corresponding to the irradiation image from the image pickup device 99, and obtains the position information (LED position information) of each light emitting diode 30 on the before-extraction head 81B based on this image pickup signal S2. Additionally, if the before-extraction head 81B is purchased from another company, the LED position information may preliminarily be written in the memory 96 by the other company. In this case, the configuration, such as the image pickup device 99, for obtaining the LED position information by image processing may be unnecessary.

Regarding the before-extraction head 81B, the controller 93 conducts the above-mentioned obtaining process, before proceeding to the grouping process. The grouping process is for grouping the before-extraction heads 81B by the similarity of distribution tendency of the light emitting diode 30. Firstly, the memory 96 records the data related to a plurality of reference lines having different shapes and curvature degrees (in the present aspect, two lines: a first reference line B1 and a second reference line B2).

Figure 6:
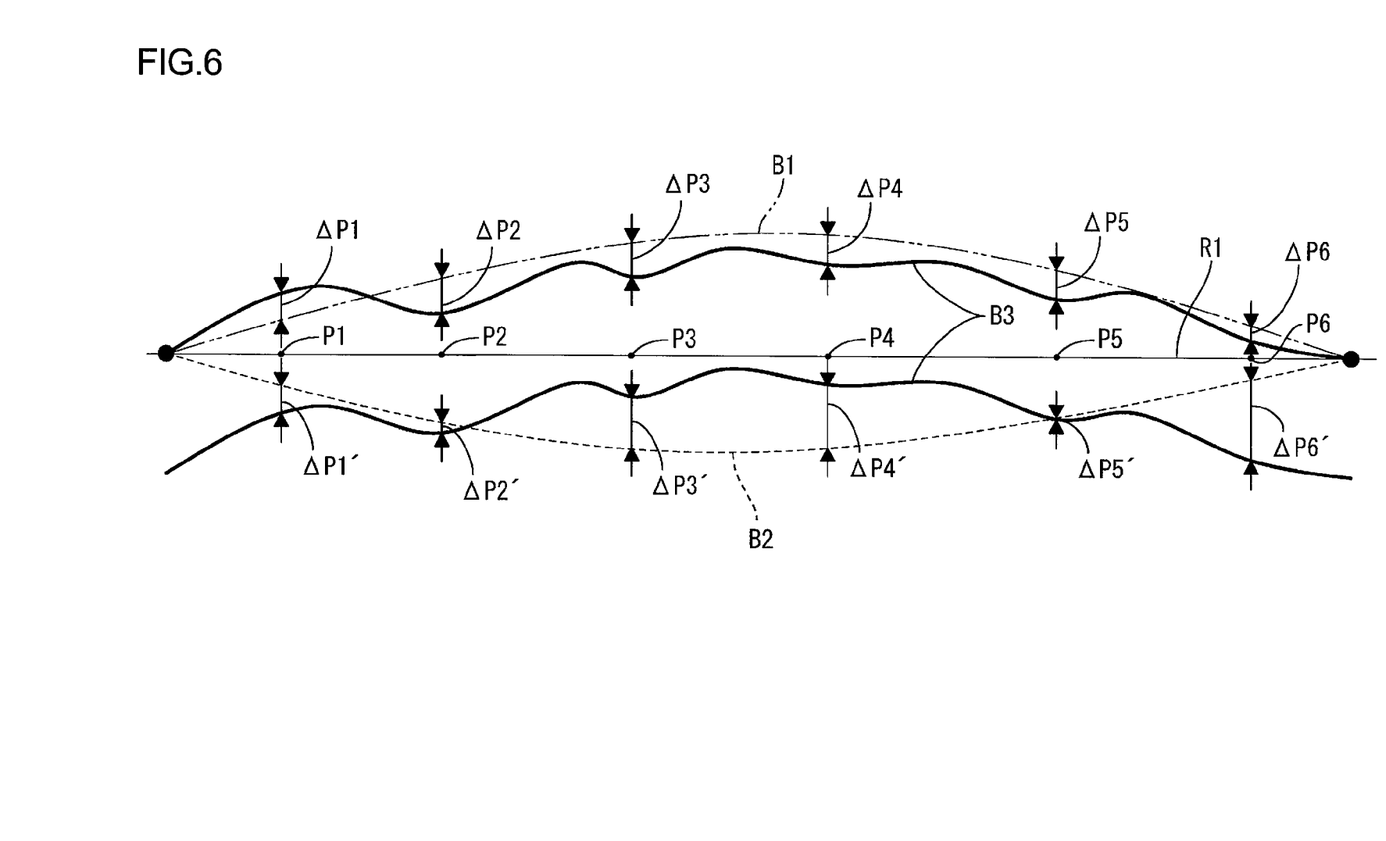
FIG. 6 is a pattern diagram showing a relationship between a first and a second reference lines and a distribution tendency line.
Figure 7:
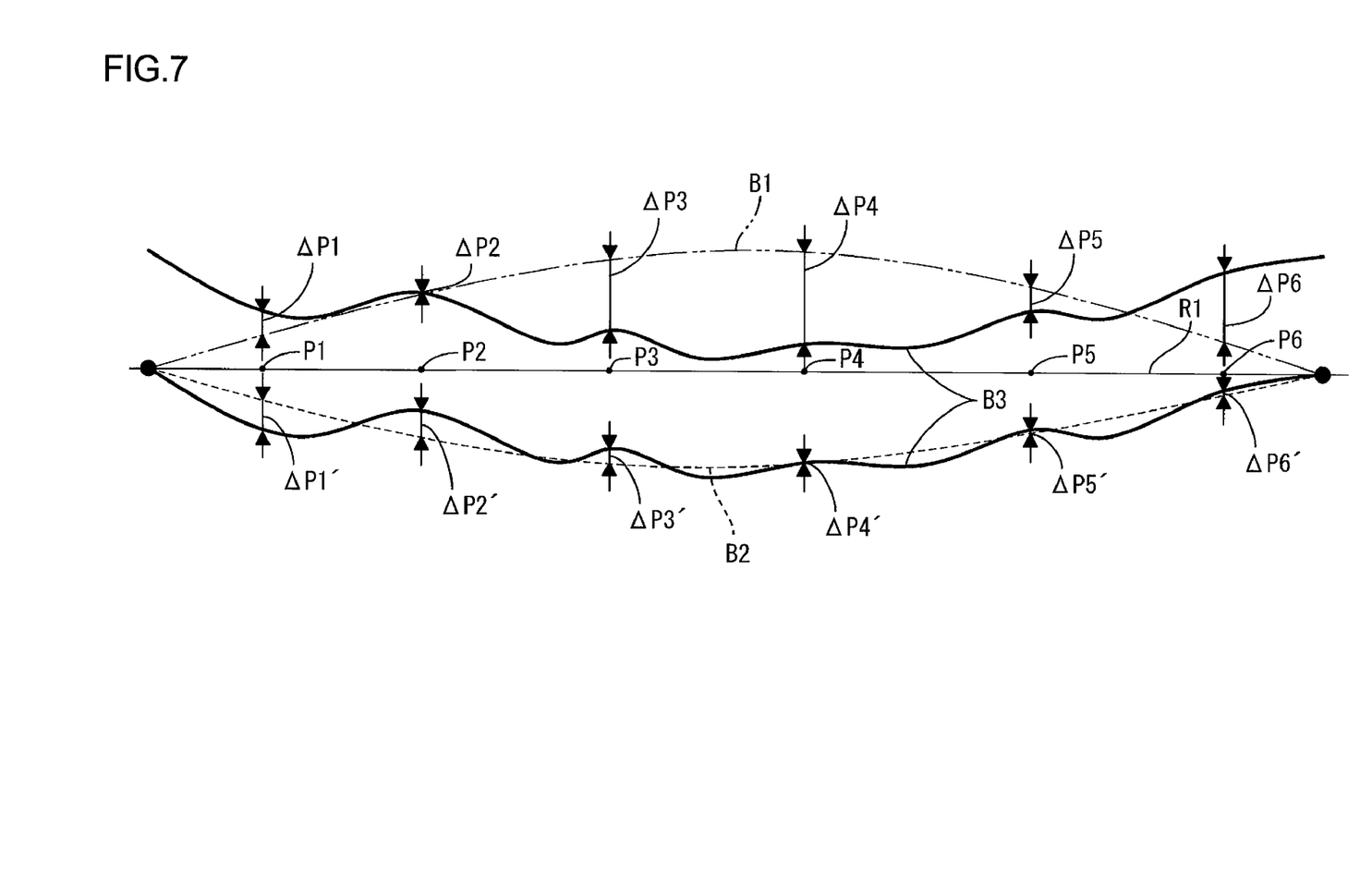
FIG. 7 is a pattern diagram showing a relationship between a first and a second reference lines and a distribution tendency line.

FIGS. 6 and 7 are pattern diagrams respectively showing a relationship between a first reference line B1, a second reference line B2, and a distribution tendency line B3 of the light emitting diode 30 based on the LED position information. The horizontal direction of each figure is the arrangement direction of the light emitting diodes 30 (hereinafter, this arrangement direction is referred to as "main scanning direction", and the direction orthogonal to the main scanning direction is referred to as "sub-scanning direction"). As shown in the same figures, the first reference line B1 and the second reference line B2 are common in terms that both are a curve line having a U shape, though are different in terms of having a different curvature direction. The controller 93 judges the before-extraction head 81B about the similarity level between its distribution tendency of the light emitting diode 30 and the first and the second reference lines B1 and B2, on the basis of the LED position information obtained in the above obtaining process and the data related to the first and the second reference lines B1 and B2.

More particularly, at a plurality of measuring points P1, P2, . . . and P6 aligned in a straight line R1 (preferably arranged at an equal interval), deviation amounts $\Delta P1$, $\Delta P2$ . . . and $\Delta P6$ between the distribution tendency line B3 and the first reference line B1 in the sub-scanning direction are calculated, and an absolute value of each of the deviation amounts (=$|\Delta P1|$, $|\Delta P2|$ . . . $|\Delta P6|$) are totaled (hereinafter, this total value is referred to as "first total value"). Similarly, at the same measuring points P1, P2, . . . and P6, deviation amounts $\Delta P1'$, $\Delta P2'$ . . . and $\Delta P6'$ between the distribution tendency line B3 and the second reference line B2 in the sub-scanning direction are calculated, and an absolute value of each of the deviation amounts (=$|\Delta P1'|$, $|\Delta P2'|$ . . . $|\Delta P6'|$) are totaled (hereinafter, this total value is referred to as "second total value").

Here, the first total value being less than the second total value means that the distribution tendency line B3 is similar to the first reference line B1, and, on the contrary, the less the second total value is than the first total value, the more similar to the second reference line B2 the distribution tendency line B3 is. Then, the controller 93 compares the first total value and the second total value. If the first total value is less than the second total value, the distribution tendency line B3 is regarded as being similar to the first reference line B1, and the before-extraction head 81B is sorted into a group 1 (see FIG. 6). On the other hand, if the second total value is less than the first total value, the distribution tendency line B3 is regarded as being similar to the second reference line B2, and the before-extraction head 81B is sorted into a group 2 (see FIG. 7).

Figure 8:
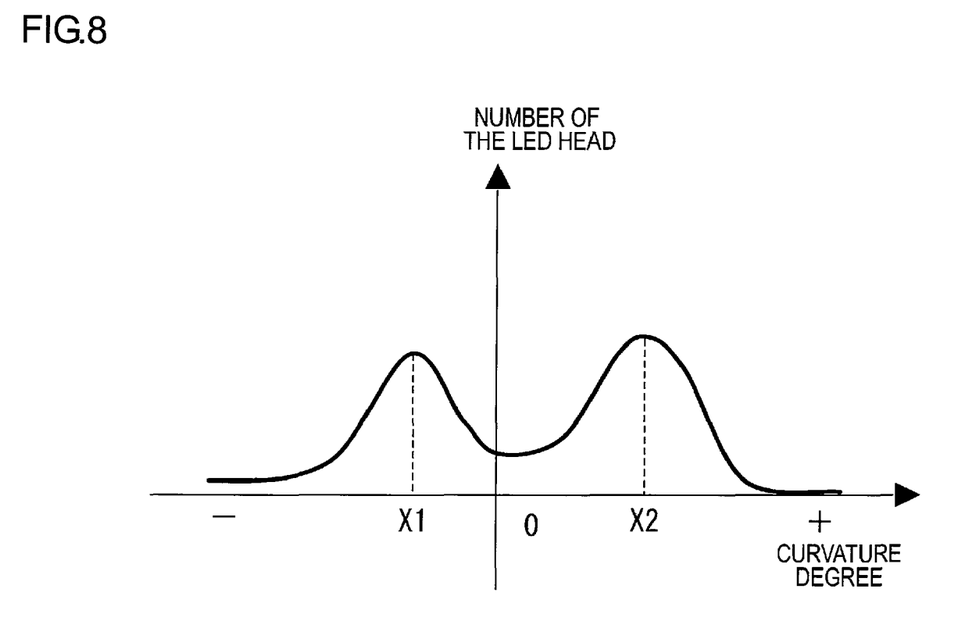
FIG. 8 is a graph showing a distribution tendency of a group of light emitting diodes.

Additionally, the first reference line B1 and the second reference line B2 are preferred to be decided as follows. For example, when the LED heads 81 are mass-produced or purchased in a large volume from another company, a graph as shown in FIG. 8 is drafted by sampling the distribution tendency of the light emitting diode 30 of a group of the LED heads 81. The horizontal axis in this graph shows a curvature degree of a distribution tendency line, and the curvature degree in one direction grows large as going to the right side (in the figure, shown as the plus direction), while the curvature degree in a direction opposite to the above one direction grows large as going to the left side (in the figure, shown as the minus direction). The vertical axis shows the number of the LED head 81 having similar distribution tendency.

According to the graph in FIG. 8, it can be seen that the number of the exposing units 23 having the curvature degree similar to X1 and X2 is particularly large. Then, the above-mentioned first reference line B1 and the second reference line B2 are decided respectively as a line of curvature degree of X1 and X2. That way, the LED heads 81 that should belong to the group 1 or the group 2 can be efficiently collected.

After the grouping process, the process proceeds to the applying process of identification information. In the applying process of identification information, the controller 93 in the processing apparatus 91 writes group information indicating the sorted group of the after-extraction head 81A (one example of identification information) into the above memory 86, and displays this group information on the display member 95. Then, seeing the display on the display member 95, the operator attaches an identification seal 87A showing the sorted group to, for example, the top of the support member 87 of the LED head 81 (see FIG. 3). As mentioned, with the identification seal 87A attached, the operator can easily see which group each of the LED head 81 belongs to in the assembling process. After the grouping process, the operator extracts four LED heads 81 (after-extraction heads 81A) required for the printer 1 from whichever group, either group 1 or group 2.

(2) Assembling Process

In the assembling process, four after-extraction heads 81A are assembled in the printer 1. Here, the printer 1 has a judging function of arrangement error of the LED head. This judging function of arrangement error of the LED head judges if the distribution tendency of the light emitting diodes 30 are all similar, in regard to the four LED heads 81 assembled in the printer 1 in the manufacturing stage of the printer 1 or in the maintenance stage such as replacing the LED head 81.

Figure 9:
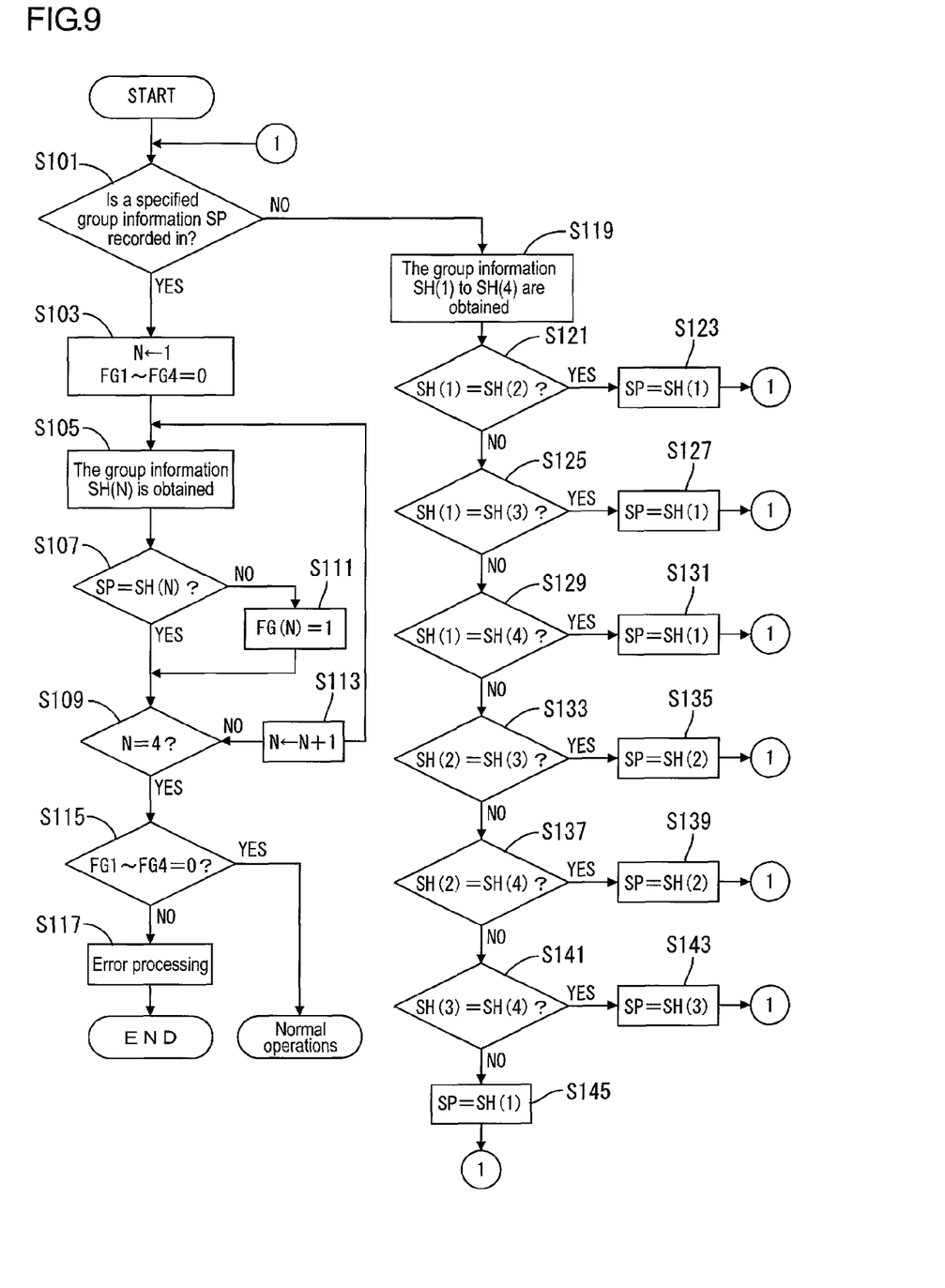
FIG. 9 is a flow chart showing a judging processing of arrangement error.

For example, after assembling four LED heads 81 in the printer 1, when the power source of the printer 1 is turned ON, the CPU 61 in the printer 1 executes the judging processing of arrangement error of the LED head as shown in FIG. 9. At this time, the CPU 61 functions as a "control portion". First, in the step S101, it is judged whether a specified group information SP is recorded in, for example, a NVRAM 67. In the present aspect, the specified group information SP can indicate from either group 1 and/or group 2.

If the specified group information SP is recorded (S101: Yes), the head number N is reset to the default "1" in S103, and then all flags: FG(1), FG(2), FG(3), and FG(4) are cleared to zero, so that the group information SH(N) is obtained from the memory 86 in each LED head 81 in S105. Additionally, the head number N is: "1" for the LED head provided in a position to expose the photoreceptor 33 of black images, "2" for the LED head provided in a position to expose the photoreceptor 33 of cyan images, "3" for the LED head provided in a position to expose the photoreceptor 33 of magenta images, and "4" for the LED head provided in a position to expose the photoreceptor 33 of yellow images.

The CPU 61 conducts arrangement error judgment in S107. In particular, it is judged whether the group information SH (N) agrees with the specified group information SP, and if so (S107: Yes), the process proceeds to S109, with the flag FG(N) left being "0". If not (S107: No), "1" indicating disagreement is set to the flag FG(N) in S111, and then process proceeds to S109.

If there remains the LED head 81 not yet subjected to the arrangement error judgment (S109: No), "1" is added to the head number N in S113, and then the process goes back to S105. On the other hand, if not (S109: Yes), and when the group information SH(N) of the LED heads 81 of all colors agrees with the specified group information SP in S115 (S115: Yes), it is allowed to move on to normal operations for conducting other processing.

In response to this, if there is the LED head 81 having the group information SH(N) that does not agree with the specified group information SP (S115: No), a message suggesting that the LED head 81 provided in a position corresponding to this head number N should be replaced with another LED head 81 is displayed on, for example, the display member 71 in S117. Additionally, the above message may be sent by speech, or, if it is in manufacturing state, may be transmitted to a high order device in the manufacturing line of the printer 1 through data communication. At this time, the CPU 61 functions as "inform portion".

If the specified group information SP is not recorded (S101: No), the following processing decides, in principle, the group information indicating a group to which half of four LED heads 81 belong as the specified group information.

Firstly, the group information SH(1) to SH(4) are obtained from the memories 86 of all the LED heads 81 in S119. Then, it is judged whether or not the group information SH(1) agrees with group information SH(2) in S121. In other words, it is judged if the LED head 81 for black images and the LED head 81 for cyan images belong to the same group, or, whether the distribution tendency of the light emitting diode 30 is similar or not.

If the group information SH(1) agrees with the group information SH(2), this group information SH(1) is decided as the specified group information SP, and then recorded in the NVRAM 67 in S123. Moreover, even if the group information SH(1) does not agree with the group information SH(2) (S121: No), yet if it agrees with the group information SH(3) (S125: Yes), similar to S123, this group information SH(1) is decided as the specified group information SP, and then recorded in the NVRAM 67. Furthermore, even if the group information SH(1) does not agree with either the group information SH(2) or the group information SH(3) (S125: No), and yet if it agrees with the group information SH(4) (S129: Yes), similar to S123, this group information SH(1) is decided as the specified group information SP, and then recorded in the NVRAM 67.

If the group information SH(1) does not agree with any one of the group information SH(2) to SH(4) (S129: No), it is judged whether the group information SH(2) agrees with the group information SH(3) in S133. If so (S133: Yes), this group information SH(2) is decided as the specified group information SP in S135, and then recorded in the NVRAM 67. Also, even if the group information SH(2) does not agree with the group information SH(3) (S133: No), and yet if it agrees with the group information SH(4) (S137: Yes), similar to S135, this group information SH(2) is decided as the specified group information SP in S139, and then recorded in NVRAM 67.

If the group information SH(2) does not agree with any of the group information SH(3) and SH(4) (S137: No), it is judged whether the group information SH(3) agrees with the group information SH(4) in S141. If so (S141 Yes), this group information SH(3) is decided as the specified group information SP in S143, and then recorded in the NVRAM 67.

In response to this, if the group information SH(3) does not agree with the group information SH(4) (S141: No), the group information SH(1) is decided as the specified group information SP in S145, and then recorded in the NVRAM 67. In addition, like the above grouping process, when the LED heads 81 are sorted into the two groups 1 and 2 so that the after-extraction heads 81 include only the heads belonging to any one of the two groups 1 and 2, the group information SH(1) or the group information SH(2) is decided as the specified group information SP. However, when the LED heads 81 are sorted into three or more groups, the group information SH(3) and the group information SH(4) may be decided as the specified group information SP.

[Effect of the Present Aspect]

(1) According to the present aspect, two or more LED heads 81 having similar distribution tendency of the light emitting diode 30 are extracted and assembled in the printer 1, so as to form exposing lines (a line similar to any one of the first reference line B1 and the second reference line B2 shown in FIGS. 6 and 7) having similar tendency on the photoreceptor 33. And thus, without a need for conducting a correction processing for restraining the degradation of image quality caused by the difference of distribution tendency of the light emitting diode 30, the degradation of image quality due to the same cause can be restrained. This allows the printer 1 not to include any configuration for conducting the above correction processing (a circuit or a program for conducting correction processing, and a memory region for storing data for the correction). Additionally, if the printer 1 is provided with a configuration for the above correction processing, the correction processing may be executed only when the situation meets certain conditions, such as, for example, when requiring the image quality higher than a prescribed level. Otherwise, the correction processing is not conducted so that the processing load may be reduced.

In addition, each LED head 81 may also have a difference in the arrangement direction of the light emitting diode 30 other than the distribution tendency, due to a manufacturing error. According to the present aspect, as shown in FIG. 3, a longitudinal direction of the support member 87 is defined as, for example, a direction of the straight line R2 connecting the above-mentioned reference holes 89A and 89B (in particular, connecting the centers, the upper ends, or the lower ends of both the reference holes 89A and 89B) formed in the support member 87. On the other hand, an arrangement direction of the light emitting diode 30 is defined as a direction of the above-mentioned straight line R1. The printer 1 is configured to be capable of conducting correction processing for restraining degradation of image quality caused by a difference in inclination of this arrangement direction.

(2) According to the present aspect, the before-extraction heads 81B are sorted into the two groups 1 and 2. Therefore, in response to a result of the sorting, for example, a group to which the largest number of the LED heads 81 belong may be selected, and then the after-extraction heads 81A may be extracted from the group.

(3) In the grouping processing, the first reference line B1 and the second reference line B2 having different shapes and curvature degrees are preliminarily set, and in accordance with whether the distribution tendency line B3 of the before-extraction head 81B is similar to the first reference line B1 or the second reference line B2, the grouping is conducted. Accordingly, a grouping method can be changed by changing the line shape of the first reference line B1 and the second reference line B2, and thus, an LED head group having a preliminarily-aimed and specific distribution tendency can be efficiently collected.

(4) The printer 1 has a judging function of arrangement error of an LED head Accordingly, a worker can be informed of a judgment result on whether the LED heads 81 of a different distribution tendency are assembled in the body of the printer 1 at the time of assembling the printer 1 and maintenance after shipment. Particularly, this is effective when the identification seal 87A of a wrong group has been attached to the LED head 81 in the extracting process.

[Another Aspect]

Figure 10:
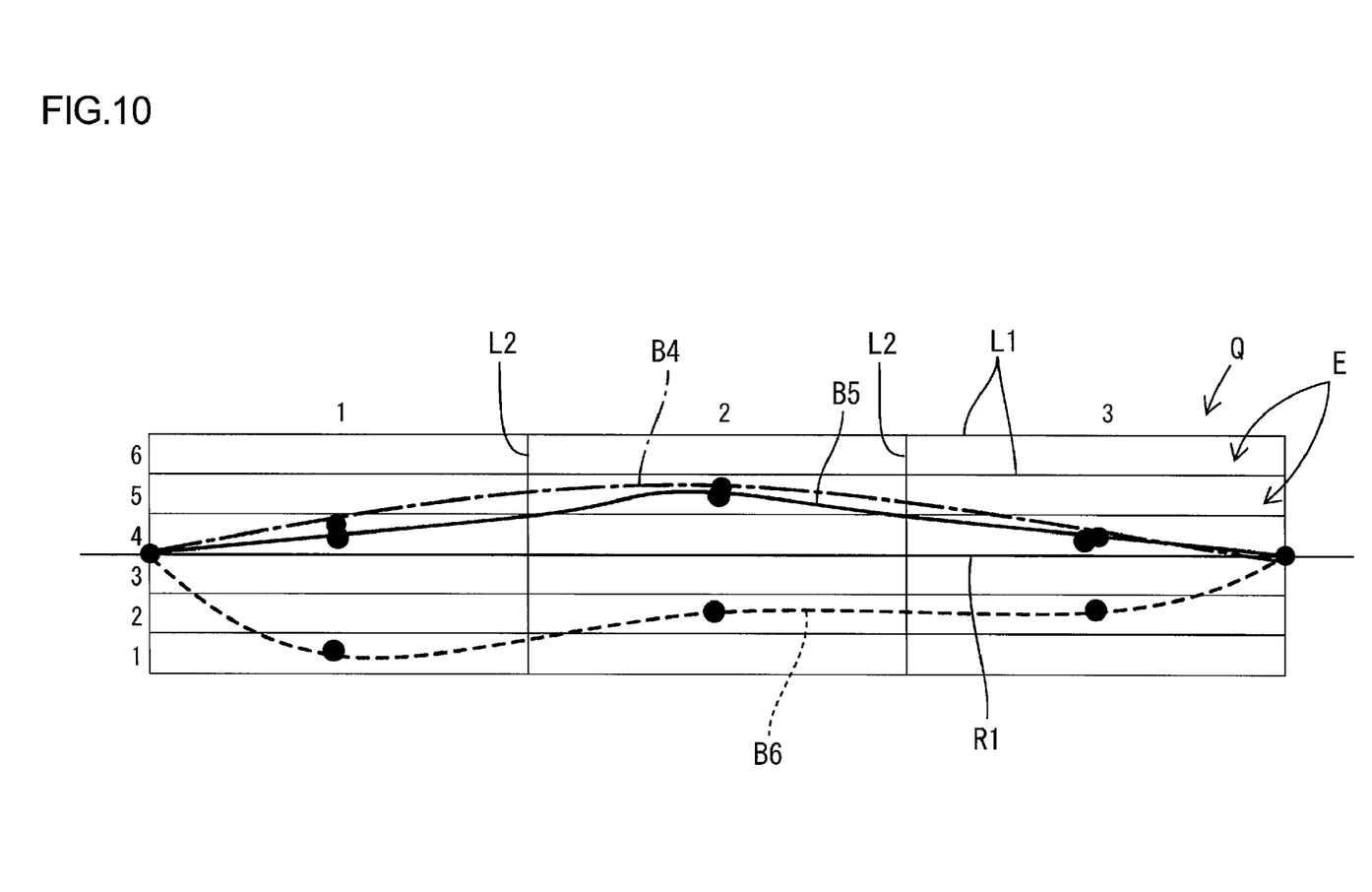
FIG. 10 is a pattern diagram showing a distribution tendency line and a divided region of each LED head in another aspect.

FIG. 10 shows another aspect of the present invention. This grouping process differs from the previous aspect, and other points are the same as those in previous aspect. Accordingly, a repetitive description is omitted by allocating the same symbols to the same elements as previous aspect, thereby describing only the difference.

The grouping process in the present aspect decides a plurality of divided regions E by dividing an arrangement region Q of a plurality of the light emitting diodes 30 by a line parallel to (hereinafter referred to as "main scanning parallel line L1") or a line perpendicular to (hereinafter referred to as "sub-scanning parallel line 2") the arrangement direction of the plurality of the light emitting diodes 30, and then, depending on the divided region E to which the distribution tendency of the light emitting diode 30 approaches, the before-extraction head 81B is sorted into a group.

FIG. 10 is a pattern diagram showing distribution tendency lines B4, B5, and B6, and divided regions of each LED head 81. The controller 93 in the processing apparatus 91 obtains LED position information from a plurality of before-extraction heads 81B in the obtaining processing of LED position information, and then conducts the grouping processing based on this LED position information and the divided region information recorded in, for example, the memory 96. The divided region information includes information for deciding the main scanning parallel line L1 and the sub-scanning parallel line L2.

[Grouping Process]

As shown in FIG. 10, the arrangement region Q near the straight line R1 is divided into a plurality of numbers (6 in the present aspect) in the sub-scanning direction by a plurality of main scanning parallel lines L1. This allows an arrangement error amount of the light emitting diode 30 relative to the straight line R1 (an arrangement error amount in the sub-scanning direction) to be classified by region divided by the above main scanning parallel lines L1 ("1" to "6" in FIG. 10). Additionally, a plurality of main scanning parallel lines L1 are preferred to be positioned at a prescribed interval by the same number in both sides of the straight line R1 in the center.

Also, the above arrangement region Q is multi-divided (three in the present aspect) in the main scanning direction by a plurality of sub-scanning parallel lines L2. In each division (hereinafter referred to as "measuring division") divided by the sub-scanning parallel lines L2, the controller 93 finds an average rank as an error rank that is the average of ranks of the above arrangement error amounts at a plurality of measuring points (points on the straight line R1), or a rank of the arrangement error amount at a measuring point in each the measuring division (the center point in each the measuring division is preferred) as an error rank. In addition, a plurality of the sub-scanning parallel lines L2 are preferred to be positioned at regular intervals.

Regarding the distribution tendency lines B4 to B6 of the above-mentioned plurality of the before-extraction heads 81B, when error ranks agrees in every measuring division, the distribution tendency of the light emitting diodes 30 are judged to be similar; when the number of the measuring division having the error rank that does not agree is more than a prescribed number (one in the present aspect), the distribution tendency is judged not to be similar. In the example in FIG. 10, the error ranks of the distribution tendency line B4 and the distribution tendency line B5 agree in every measuring division, and the two before-extraction heads 81B corresponding to the distribution tendency line B4 and the distribution tendency line B5 are therefore judged to be classified into the same group. On the other hand, the distribution tendency line B6 is classified into the other group, since its error rank does not agree with those of the other two distribution tendency lines B4 and B5 in every measuring division.

According to the present aspect, various variations of grouping can be conducted, depending on a setting method of divided regions. A plurality of the divided regions E include a region positioned in one side of the straight line R1 and a region positioned in the other side. Accordingly, with the straight line R1 as a reference, the before-extraction heads 81B having different distribution tendency can certainly be sorted into different groups.

Also, a plurality of measuring divisions are set by dividing the arrangement region Q of the light emitting diodes 30 in the main scanning direction, and the error rank of each measuring division is judged whether or not to agree with each other, so that grouping is conducted based on the judgment result. Accordingly, grouping can be conducted at an accuracy corresponding to the number of measuring divisions.

[Other Aspects]

The present invention is not limited to the aspects described above with reference to the accompanying figures, and, for example, the following can also be included in the technical scope of the present invention. Particularly, in the components of each aspect, components other than those of the most significant invention are additional element, and can therefore be accordingly omitted.

(1) In the above extracting process, the before-extraction heads 81 are sorted into a plurality of groups, however, the present invention is not limited to this, and a prescribed distribution tendency may be preliminarily decided, so that only one group having distribution tendency similar to this prescribed distribution tendency is extracted.

(2) The exposing unit 23 includes the light emitting diode 30, however, the present invention is not limited to this, and a light emitting element such as an EL (Electro Luminescence) element and a fluorescent body may be multi-arranged, so that these light emitting diodes may selectively emit light in accordance with image data. Or, a light shutter composed of, such as, a liquid crystal element and a PLZT may be multi-arranged, so that a light emitted from a light source is controlled by selectively controlling the timing for opening and closing these light shutters.

(3) The printer 1 is a four-color printer and includes four LED heads 81 corresponding to each color, however, the present invention is limited to this, and the printer 1 may be a color printer of a plurality of colors other than four colors (such as two colors and six colors) and may include a plurality of LED heads 81 corresponding to each color. Moreover, LED heads 81 do not have to correspond to a different color, and for example, a different LED head 81 may expose an individual photoreceptor 33 so that an electrostatic latent image on each photoreceptor 33 is developed by the toner of the same color. However, the present invention is particularly effective in regard to each of the LED heads 81 corresponding to different colors, since a color deviation caused by a difference of distribution tendency of the light emitting diodes between these LED heads 81 might largely affect image quality.

(4) In the above aspect, all the LED heads 81 assembled in the printer 1 are regarded as the after-extraction heads 91A resulted from extraction processing, however, the present invention is not limited to this, and a part of the LED heads 81 may not be subjected to the extraction processing. As to the LED heads 81 for yellow image, that is low in visibility, it has a less influence on image quality even when having distribution tendency different from those of other LED heads 81. Accordingly, the LED head 81 for yellow image may not have to be subjected to the extraction processing.

(5) In the above aspect, group information is written in the memory 86 in the LED head 81 in the applying process of identification information, however, the present invention is not limited to this, such that the LED position information may be written in. In this case, in the judging processing of arrangement error shown in FIG. 9, the specified group information SP is a specified LED position information SP, while each group information SH (N) is the LED position information SH (N). In addition, the similarity levels between the specified LED position information SP and the LED position information SH (N), and between each the LED position information SH (N) are judged in S107, S121, S125, S129, S133, S137, and S141.

(6) In the above aspect, the before-extraction heads 81B are sorted into two groups 1 and 2 by two reference lines: the first reference line B1 and the second reference line B2, however, they may be sorted into three or more groups by three or more reference lines. In this case, one of the reference lines is preferred to be the above straight line R1. That is because, the LED head 81 similar to the straight line R1 stochastically exists for a certain amount, and using a group of the LED heads similar to the straight line R1 is expected to effectively restrain the degradation of image quality.

(7) In the above aspect, the straight line R1 is a partition line for setting divided regions, however, the present invention is not limited to this, and a region surrounded by two main scanning parallel lines L1 with the straight line R1 in between may be a divided region. This allows a group of the before-extraction heads 81B similar to the straight line R1 to be sorted into one group.

(8) In the above aspect, regarding division of the arrangement region Q, the dividing number in the sub-scanning direction is 6, while the dividing number in the main scanning direction is 3, however, the present invention is not limited to this, and dividing pattern may be various based on, such as grouping accuracy, variation degree in distribution tendency, and processing load. For example, for the purpose of reducing processing load and memory capacity, the dividing number in the sub-scanning direction may be 2, while the dividing number in the main scanning direction may be 1.

(9) Also, in the above aspect, the before-extraction heads 81B are judged to be similar each other when their error ranks agree with each other, however, the present invention is not limited to this, and they may be judged to be similar only when their arrangement error amounts at a predetermined measuring point agree with each other. With such configuration, there is no need to set divided regions.

Figure 11:
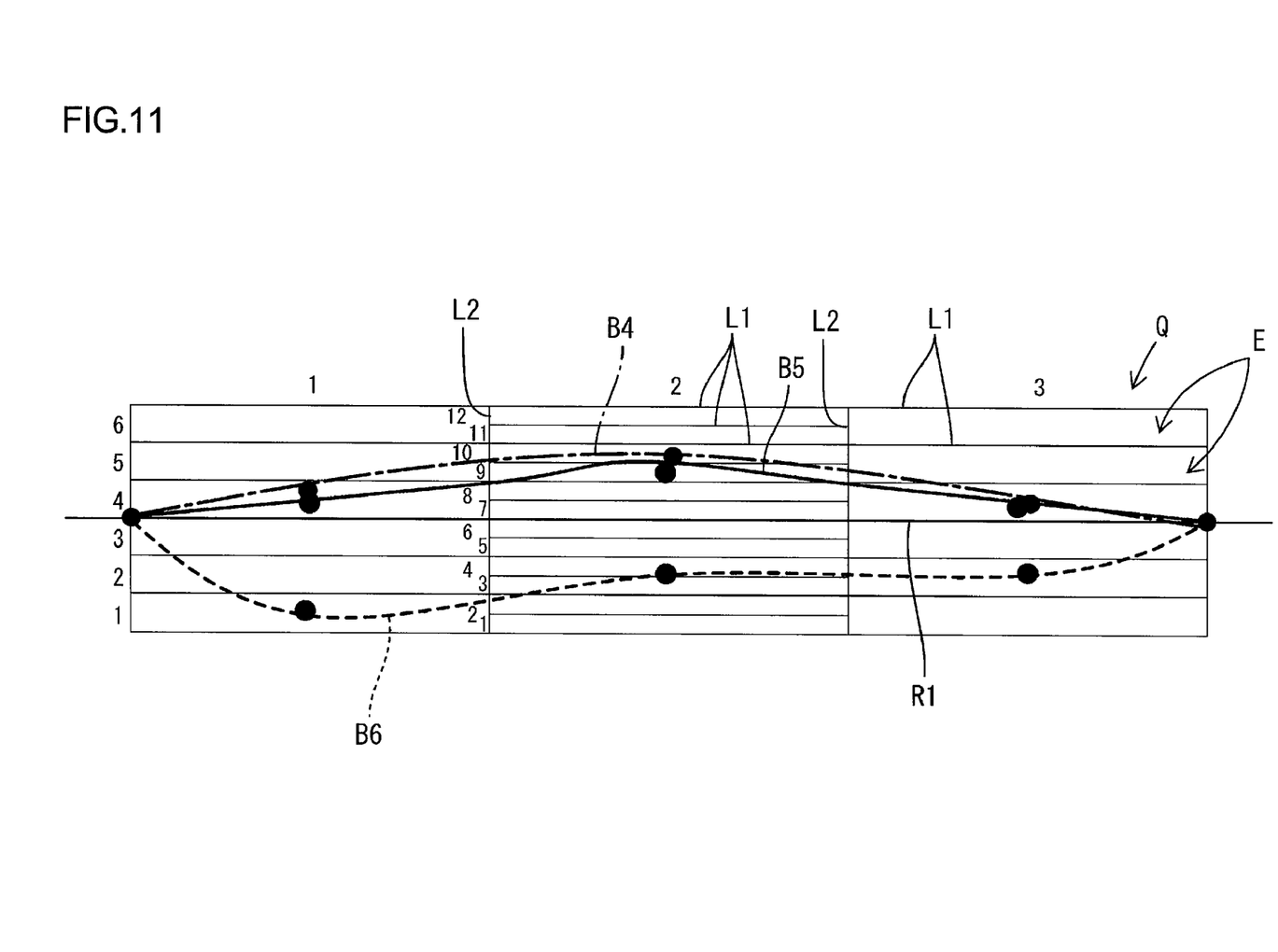
FIG. 11 is a pattern diagram showing a distribution tendency line and a divided region of each LED head in a first variation.

(10) In the above aspect, a plurality of measuring divisions are divided by the same main scanning parallel lines L1 at equal intervals in the sub-scanning direction, however, the present invention is not limited to this, and a dividing width may be changed for each measuring division. Particularly, as shown in FIG. 11, the central measuring divisions are preferred to be divided more finely in the sub-scanning direction than the measuring divisions close to the both ends. Since the light emitting diodes 30 close to the center in the main scanning direction generally conduct much of exposure based on image data, a difference of distribution tendency of the light emitting diode 30 closer to the center than the both ends largely affects image quality. Because of this, the configuration in FIG. 11 is preferred.

Figure 12:
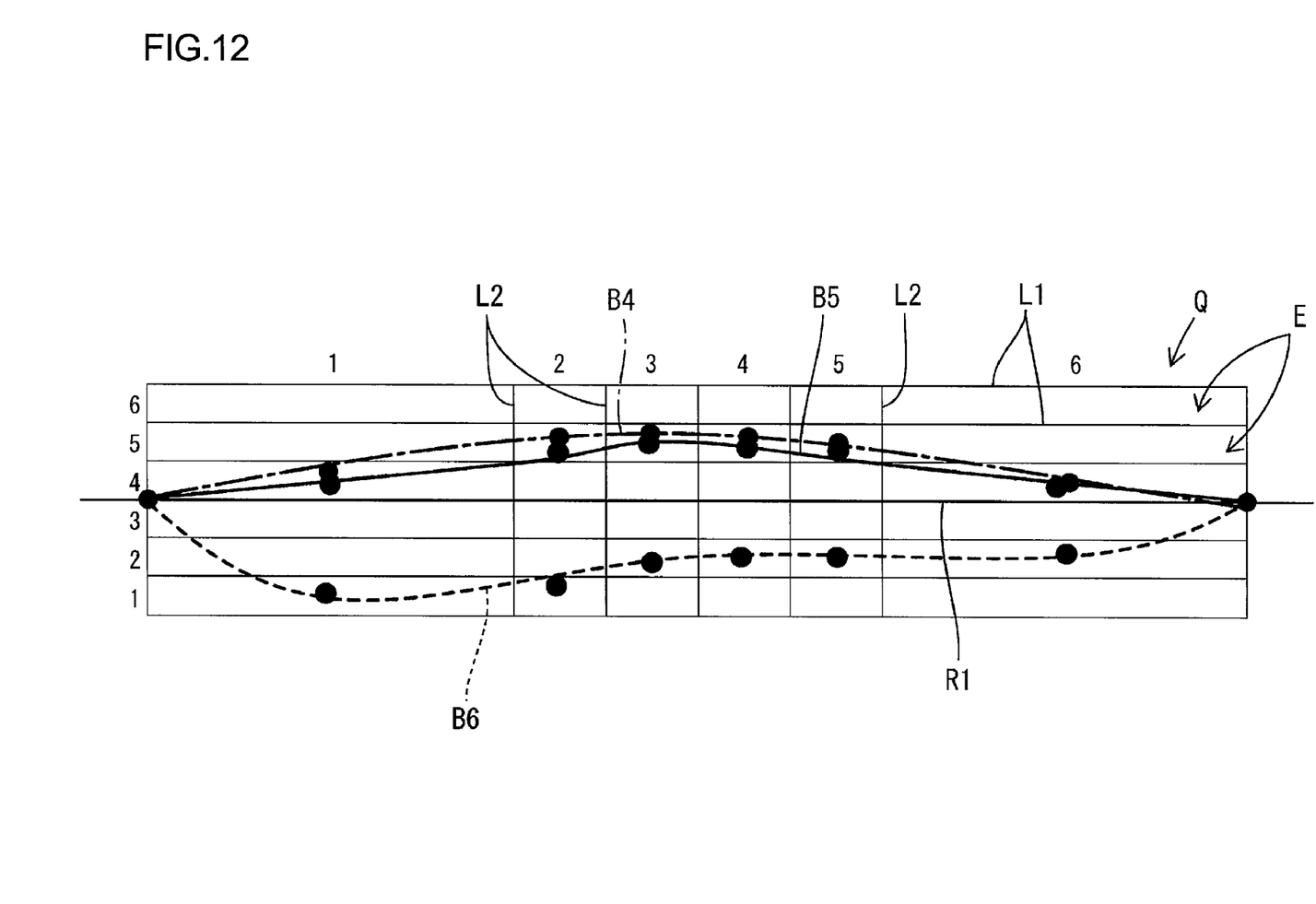
FIG. 12 is a pattern diagram showing a distribution tendency line and a divided region of each LED head in a second variation.

(11) Additionally, in the above aspect, a plurality of measuring divisions are divided by the sub-scanning parallel lines L2 positioned at equal intervals in the main scanning direction, however, the present invention is not limited to this, and a division width may be changed for each measuring division. Particularly, as shown in FIG. 12, the measuring divisions close to the center are preferred to be divided more finely in the main scanning direction than the measuring divisions close to the both ends.

What is claimed is:

1. A method of manufacturing an image forming apparatus that includes a plurality of exposing devices having a plurality of light emitting elements arranged therein, said method comprising:
an extracting process for extracting a plurality of after-extraction exposing devices having a similar distribution tendency of said plurality of light emitting elements from a plurality of before-extraction exposing devices, and
an assembling process for assembling said plurality of after-extraction exposing devices into a body of said image forming apparatus,
wherein a grouping process for grouping said plurality of said before-extraction exposing devices by having a similar distribution tendency to each other is executed in said extracting process, so that said plurality of after-extraction exposing devices, that belong to one group in a plurality of groups divided in said grouping process, are extracted, and
wherein said grouping process defines a plurality of reference lines having different shapes, and judges similarity of said distribution tendency of said light emitting elements and each of said plurality of reference lines in each said exposing device, so as to group said plurality of before-extraction exposing devices based on these similarities.

2. A method of manufacturing an image forming apparatus of claim 1, wherein all said exposing devices in said image forming apparatus after said assembling process result from having been extracted in said extracting process, and have said distribution tendency similar to each other.

3. A method of manufacturing an image forming apparatus of claim 1, wherein said grouping process defines a plurality of divided regions obtained by dividing an arrangement region of said plurality of light emitting elements by lines parallel in said arrangement direction of said plurality of light emitting elements, and groups said plurality of before-extraction exposing devices, on said basis of which divided region in said plurality of divided regions said distribution tendency of said light emitting diode is close to.

4. A method of manufacturing an image forming apparatus of claim 3, wherein said plurality of divided regions include a region positioned on one side of a straight line connecting both ends of said plurality of light emitting elements and a region positioned on said other side of said straight line.

5. A method of manufacturing an image forming apparatus of claim 3, wherein an arrangement region of said plurality of light emitting elements is divided by a line parallel to a direction orthogonal to said arrangement direction so as to define said divided region.

6. A method of manufacturing an image forming apparatus of claim 5, wherein said center of said arrangement direction is divided by at least any one of lines parallel to said arrangement direction and parallel to said orthogonal direction more finely than said both end sides.

7. A method of manufacturing an image forming apparatus of claim 1, wherein a plurality of groups divided in said grouping process include a group, to which before-extraction exposing devices having said distribution tendency of said light emitting element similar to a straight line connecting both ends of said plurality of light emitting elements belong.

8. A method of manufacturing an image forming apparatus of claim 1, wherein said grouping process includes a process for applying identification information of a group, to which said before-extraction exposing device belongs, to each of said before-extraction exposing devices.

\* \* \* \* \*